United States Patent
Otte et al.

(10) Patent No.: US 12,467,721 B2
(45) Date of Patent: Nov. 11, 2025

(54) TRAINING DISRUPTOR DEVICE SIMULATION SYSTEM

(71) Applicant: Ti Training, LLC, Golden, CO (US)

(72) Inventors: Gregory Otte, Lakewood, CO (US); Todd R. Brown, Lakewood, CO (US); Kila J. Otte, Evergreen, CO (US); William T. Otte, Golden, CO (US)

( * ) Notice: Subject to any disclaimer, the term of this patent is extended or adjusted under 35 U.S.C. 154(b) by 714 days.

(21) Appl. No.: 17/883,457

(22) Filed: Aug. 8, 2022

(65) Prior Publication Data

US 2023/0044352 A1 Feb. 9, 2023

Related U.S. Application Data (60) Provisional application No. 63/231,214, filed on Aug. 9, 2021.

(51) Int. Cl.
*F41G 3/26* (2006.01)
*F41H 13/00* (2006.01)

(52) U.S. Cl.
CPC ........ *F41G 3/2655* (2013.01); *F41H 13/0025* (2013.01)

(58) Field of Classification Search
CPC .... F41G 3/2655; F41H 13/0031; F41A 33/00; F41A 33/02
See application file for complete search history.

(56) References Cited

U.S. PATENT DOCUMENTS

| | | | |
|---|---|---|---|
| 2007/0122770 A1* | 5/2007 | Swensen | A62C 99/0081 434/16 |
| 2007/0287132 A1* | 12/2007 | LaMons | F41A 33/00 434/11 |
| 2007/0297117 A1* | 12/2007 | Elliott | F41A 33/02 361/232 |
| 2014/0045146 A1* | 2/2014 | Otte | F41G 3/2627 434/21 |
| 2015/0125828 A1* | 5/2015 | Otte | G09B 9/003 434/11 |
| 2019/0257623 A1* | 8/2019 | Nerheim | F41H 13/0025 |
| 2023/0066624 A1* | 3/2023 | Gish | F41H 13/0025 |

* cited by examiner

*Primary Examiner* — Peter R Egloff
(74) *Attorney, Agent, or Firm* — Leyendecker & Lemire, LLC (57) ABSTRACT

A training disruptor device simulation system is described. The training disruptor device simulation system can include a training disruptor device and a simulator system. The training disruptor device can be configured to mimic a conducted electrical weapon and generate signals that can be detected and analyzed by the simulator system.

20 Claims, 6 Drawing Sheets

TRAINING DISRUPTOR DEVICE SIMULATION SYSTEM

CROSS-REFERENCE TO RELATED APPLICATION

This application claims the benefit of U.S. Provisional Application No. 63/231,214, filed Aug. 9, 2021.

BACKGROUND

Conducted electrical weapons (CEWs), including the TASER 7® CEW marketed by Axon Enterprise, Inc., are used by police officers and civilians alike as a less-lethal alternative to firearms. Proper training and handling are paramount to successfully using a CEW both effectively and safely.

Since a CEW is intended to be used sparingly, it is difficult to train with a CEW without firing expensive cartridges. Police departments typically handle training officers in using a CEW, however, it can be costly to repetitively practice with one as CEW cartridges are generally more expensive than ammunition for firearms. To become effective in using a CEW, a user must continuously practice similar to becoming proficient with a firearm.

A means for simulating firing a CEW is needed. More specifically, a system for practicing with a CEW in a simulated environment is needed that implements various training models and methods.

DETAILED DESCRIPTION

Embodiments of the present invention include a training disruptor device simulation system. The training disruptor device simulation system can implement a training disruptor device and a simulator system to help train proper use of a conducted electrical weapon. As can be appreciated, the training disruptor device can be implemented to mimic a conducted electrical weapon. In one embodiment, the simulator system can be a portable system including a computer processing unit, display device, a sensor, and a receiver. The sensor and the receiver can be adapted to determine when one or more components of the training disrupter device have been activated in conjunction with a training scenario being presented by the simulator system.

Embodiments of the training disruptor device can be configured to simulate a conducted electrical weapon. For instance, the training disruptor device can include a trigger to simulate firing electrically charged probes from the device. The training disruptor device can further include one or more buttons simulating an ARC switch of a conducted electrical weapon. A user can interact with the training disruptor device while viewing a training scenario to help train the user to use a live conducted electrical weapon. The training disruptor device can be configured to generate one or more signals based on a user interacting with buttons of the training disruptor device. The simulator system can be configured to detect the one or more signals generated by the training disruptor device. The training scenarios can be implemented to mimic various scenarios where a conducted electrical weapon may be an appropriate use of force.

In one embodiment, the training disruptor device can include, but is not limited to, a body, a first infrared laser, a second infrared laser, a third infrared laser, a power button, a first actionable button, a second actionable button, a third actionable button, a first laser diode, a second laser diode, a third laser diode, a first infrared laser switch, and a second infrared laser switch. In some instances, the first laser diode, the second laser diode, the third laser diode, the first IR laser, the second IR laser, the third IR laser, the first IR laser switch and the second IR laser switch can be an engagement module. The engagement module can be configured to mimic live cartridges of a conducted electrical weapon.

The body of the training disruptor device can be implemented to simulate a body of a conducted electrical weapon. The body can house the components of the training disruptor device. The infrared lasers can be implemented to simulate probes from a cartridge of a conducted electrical weapon being discharged. The first actionable button can be implemented to simulate a trigger of the conducted electrical weapon. The second actionable button and the third actionable button can each be implemented to simulate an ARC switch of the conducted electrical weapon. The first infrared laser switch can be implemented to toggle between the second infrared laser and the third infrared laser for a first simulated shot. The second infrared laser switch can be implemented to toggle between the second infrared laser and the third infrared laser for a second simulated shot. The power button can be implemented to turn the training disruptor device on and off. The plurality of laser diodes can be implemented to show a user where the training disruptor device is aimed.

The simulator system can include, but is not limited to, a control module, a display, a receiver, and a sensor. The control module can be adapted to run a program or application which can decipher signals received by the sensor and the receiver. The display can include, but is not limited to, a liquid crystal display, a plasma display panel, a light-emitting diode display, and a digital projector. The sensor can be implemented to detect pulses of light generated by the infrared lasers. The receiver can include, but is not limited to, a universal serial bus receiver. The USB receiver can be configured to receive a signal transmitted by the emitter.

The simulator system can be implemented to present a training scenario to a user (or trainee) to test the user in proper use of a conducted electrical weapon. The components of the simulator system can detect signals (e.g., infrared light pulses) from the training disruptor device and determine if a user properly interacted with the training scenario by processing the signals from the training disruptor device.

In one example embodiment, the training disruptor device can include, but is not limited to, a body adapted to mimic a body of a TASER 7®, a first actionable button adapted to simulate a trigger of the TASER 7®, a first infrared laser operatively connected to the first actionable button, a second infrared laser oriented at approximately 12.0 degrees down from parallel with the first infrared laser and operatively connected to the first actionable button, a third infrared laser oriented at approximately 3.5 degrees down from parallel with the first infrared laser and operatively connected to the first actionable button, a first infrared laser switch adapted to toggle between the second infrared laser and the third infrared laser for a first simulated shot, and a second infrared laser switch adapted to toggle between the second infrared laser and the third infrared laser for a second simulated shot.

In another example embodiment, a training disruptor device can include, but is not limited to, a body, a first button, a second button, an emitter operatively connected to the second button, and an engagement module. The engagement module can include a first infrared laser operatively connected to the first button, a second infrared laser oriented at approximately 12.0 degrees down from parallel with the first infrared laser and operatively connected to the first button, a third infrared laser oriented at approximately 3.5 degrees down from parallel with the first infrared laser and operatively connected to the first button, a first laser diode aligned with the first infrared laser, a second laser diode aligned with the second infrared laser, a third laser diode aligned with the third infrared laser, a first infrared laser switch adapted to toggle between the second infrared laser and the third infrared laser for a first simulated shot, and a second infrared laser switch adapted to toggle between the second infrared laser and the third infrared laser for a second simulated shot. The emitter can be adapted to be activated when the second button is pushed. The first infrared laser can be adapted to be activated when the first button is engaged.

In yet another example embodiment, a training disruptor device can include, but is not limited to, a first actionable button, a first infrared laser operatively connected to the first actionable button, a second infrared laser oriented at approximately 12.0 degrees down from parallel with the first infrared laser and operatively connected to the first actionable button, a third infrared laser oriented at approximately 3.5 degrees down from parallel with the first infrared laser and operatively connected to the first actionable button, a first infrared laser switch adapted to toggle between the second infrared laser and the third infrared laser for a first simulated shot, a second infrared laser switch adapted to toggle between the second infrared laser and the third infrared laser for a second simulated shot, a first laser diode aligned with the first infrared laser, a second laser diode aligned with the second infrared laser, and a third laser diode aligned with the third infrared laser. The first infrared laser can be adapted to be activated when the first actionable button is engaged. The second infrared laser or the third infrared laser can be adapted to be activated with the first infrared laser based on a configuration of the first infrared laser switch in response to the first actionable button being engaged a first time. The second infrared laser or the third infrared laser can be adapted to be activated with the first infrared laser based on a configuration of the second infrared laser switch in response to the first actionable button being engaged a second time.

The present invention can be embodied as devices, systems, methods, and/or computer program products. Accordingly, the present invention can be embodied in hardware and/or in software (including firmware, resident software, micro-code, etc.). Furthermore, the present invention can take the form of a computer program product on a computer-usable or computer-readable storage medium having computer-usable or computer-readable program code embodied in the medium for use by or in connection with an instruction execution system. In one embodiment, the present invention can be embodied as non-transitory computer-readable media. In the context of this document, a computer-usable or computer-readable medium can include, but is not limited to, any medium that can contain, store, communicate, propagate, or transport the program for use by or in connection with the instruction execution system, apparatus, or device.

The computer-usable or computer-readable medium can be, but is not limited to, an electronic, magnetic, optical, electromagnetic, infrared, or semiconductor system, apparatus, device, or propagation medium.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

The term "software," as used in this specification and the appended claims, refers to programs, procedures, rules, instructions, and any associated documentation pertaining to the operation of a system.

The term "firmware," as used in this specification and the appended claims, refers to computer programs, procedures, rules, instructions, and any associated documentation contained permanently in a hardware device and can also be flashware.

The term "hardware," as used in this specification and the appended claims, refers to the physical, electrical, and mechanical parts of a system.

The terms "computer-usable medium" or "computer-readable medium," as used in this specification and the appended claims, refers to any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

The term "signal," as used in this specification and the appended claims, refers to a signal that has one or more of its characteristics set or changed in such a manner as to encode information in the signal. It is to be appreciated that wireless means of sending signals can be implemented including, but not limited to, Bluetooth, Wi-Fi, acoustic, RF, infrared and other wireless means.

The term "disruptor device," as used in this specification and the appended claims, refers to a conducted electrical weapon (CEW) including, but not limited to, an electroshock weapon, stun gun, and electronic control device.

The term "arc switch," as used in this specification and the appended claims, refers to an ARC user interface available on a TASER 7® CEW. ARC is an acronym for three functions: Arc display, Re-energize, and rotate Cartridge.

An Embodiment of a Training Disruptor Device Simulation System

Figure 1:
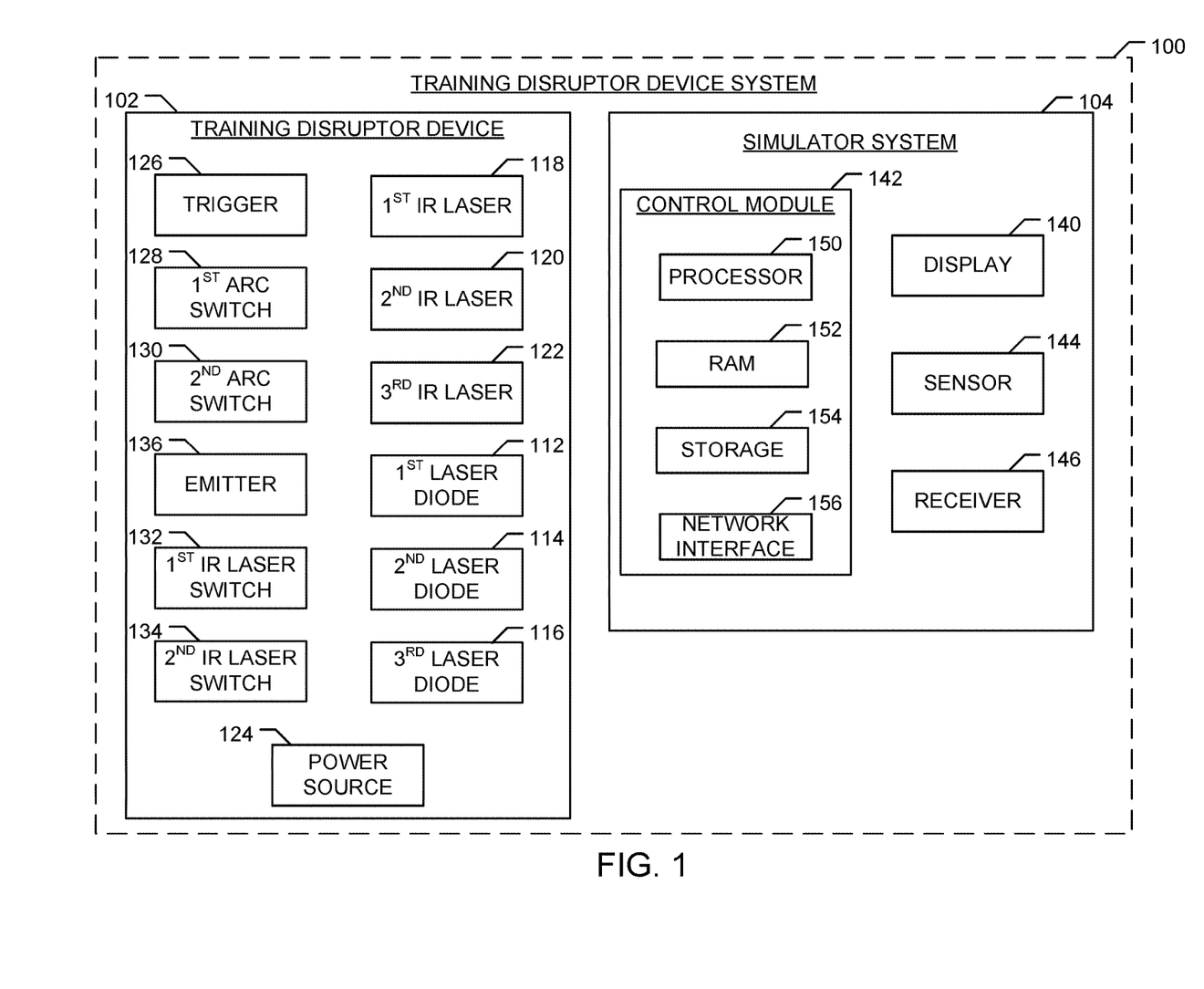
FIG. 1 is a block diagram of a training disruptor device simulation system according to one embodiment of the present invention.

Referring to FIG. 1, a block diagram of an embodiment 100 of a training disruptor device simulation system is illustrated. The training disruptor device simulation system 100 can be implemented to train a user in the proper use of a disruptor device without the need for live cartridges.

As shown, the system 100 can include, but is not limited to, a training disruptor device 102 and a simulator system 104. The training disruptor device 102 can be configured to mimic a real disruptor device (e.g., a conducted electrical weapon) such that a user can train with the training disruptor device 102 to learn how to use a live disruptor device properly and safely. The simulator system 104 can be implemented to present real life scenarios to a trainee while using the training disruptor device 102. The simulator system 104 can be configured to detect signals from the training disruptor device 102 as a user interacts with the training disruptor device 102.

In one embodiment, the training disruptor device 102 can include, but is not limited to, a device body 110 (shown in FIGS. 4A-4C), a first laser diode 112, a second laser diode 114, a third laser diode 116, a first infrared (IR) laser 118, a second infrared (IR) laser 120, a third infrared (IR) laser 122, and a power source 124. The device body 102 can typically include a first actionable button 126 (e.g., trigger), a power switch 127 (shown in FIG. 4A), a second actionable button 128 (e.g., first ARC switch), a third actionable button 130 (e.g., second ARC switch), a first infrared laser switch 132, and a second infrared laser switch 134. The second actionable button 128 and the third actionable button 130 can each be operatively connected to an emitter 136. The first IR laser 118, the second IR laser 120, and the third IR laser 122 can each be operatively connected to the first button 126. The first infrared laser switch 132 can be implemented to toggle between the second IR laser 120 and the third IR laser 122 for a first simulated shot. The second infrared laser switch 134 can be implemented to toggle between the second IR laser 120 and the third IR laser 122 for a second simulated shot.

In a typical implementation, the first laser diode 112 can be implemented as a primary laser. The first laser diode 112 can be aligned with the first IR laser 118. The first laser diode 112 can indicate to a user where they are aiming with a visible light being implemented. In one example, the first laser diode 112 can be a visible green laser. It is to be appreciated that other colors of light visible to humans can be implemented. Typically, the first laser diode 112 can always be on when the training disrupter device 102 is on.

In one embodiment, the second laser diode 114 and the third laser diode 116 can each be visible to the human eye. For instance, the second laser diode 114 and the third laser diode 116 can each be red lasers. The second laser diode 114 can be aligned with the second IR laser 120 and the third laser diode 116 can be aligned with the third IR laser 122. Generally, when the training disruptor device 102 is turned on, either the second laser diode 114 or the third laser diode 116 can be turned on with the first laser diode 112. Typically, a user can determine which of the laser diodes will be turned on by configuring the training disruptor device 102 with the first infrared laser switch 132. After the trigger 126 has been pulled a first time, a configuration of the second infrared laser switch 134 can determine if the second laser diode 114 or the third laser diode 116 can be turned on (or stay on). Of note, after the trigger 126 has been pulled twice, the second laser diode 114 (or the third laser diode 116) can be turned off. In some instances, the first laser diode 112 can be turned off after the second trigger pull.

A combination of the first IR laser 118 and either the second IR laser 120 or the third IR laser 122 can be activated when the trigger 126 is engaged. Of note, the first infrared laser switch 132 can determine a combination of the IR lasers 118-122 for a first trigger pull and the second infrared laser switch 134 can determine a combination of the IR lasers 118-122 for a second trigger pull. In a typical implementation, the first IR laser 118, along with either the second IR laser 120 or the third IR laser 122, may only activate two times until the training disruptor device 102 needs to be reset so that the IR lasers will activate again. Of note, this may be implemented to simulate a user replacing cartridges that have been used with new cartridges.

In one instance, the second IR laser 120 can be angled at approximately 3.5° down from parallel with the first IR laser 118. The third IR laser 122 can be angled at approximately 12.0° down from parallel with the first IR laser 118. The second laser diode 114 can be angled at approximately 3.5° down from parallel with the first laser diode 112 and coincide with the second IR laser 120. The third laser diode 116 can be angled at approximately 12° down from parallel with the first laser diode 112 and coincide with the third IR laser 122. Of note, the second IR laser 120 can be implemented in combination with the first IR laser 118 to simulate a long-distance cartridge of a conducted electrical weapon. The third IR laser 122 can be implemented in combination with the first IR laser 120 to simulate a short-distance cartridge of a conducted electrical weapon.

In a typical implementation, the second IR laser 120 and the third IR laser 122 can be activated when the trigger 126 is engaged (or pulled). Depending on a configuration set by a user, the second IR laser 120 or the third IR laser 122 can activate after the first IR laser 118 has been activated by a trigger pull. It is to be appreciated that embodiments are contemplated where either the second IR laser 120 or the third IR laser 122 are activated before the first IR laser 118. In one instance, the second IR laser 120 and the third IR laser 122 can activate approximately 0.2 to 0.3 seconds after the first IR laser 118 has been activated.

As previously mentioned, whether the second IR laser 120 or the third IR laser 122 is activated after the trigger pull can be determined by the first infrared laser switch 132 and the second infrared laser switch 134. In one instance, the infrared laser switches 132, 134 can each be actionable toggles where a user can move the switches from a first position to a second position and back. As can be appreciated, the user may select a configuration of the training disruptor device 102 by interacting with the infrared laser switches 132, 134.

In one embodiment, the first IR laser 118, the second IR laser 120, and the third IR laser 122 can be adapted to generate a pulse of light with a wavelength in the infrared spectrum. The IR lasers 118-122 can be activated in response to the trigger 126 being pulled. In one example, the first IR laser 118, the second IR laser 120, and the third IR laser 122 can each generate a pulse of light with a wavelength of 785 nm plus or minus 50 nm. Typically, lasers adapted to generate pulses of light not visible to a human are implemented including, but not limited to, infrared spectrum lasers. It is to be appreciated that other means of generating waves in the non-visible light spectrum can be implemented without exceeding the scope of the present invention.

In one example embodiment, the first IR laser 118 in combination with one of either the second IR laser 120 or the third IR laser 122 can be implemented to mimic an actual trajectory of two probes fired from a live cartridge of a TASER 7®. Generally, the first IR laser 118, the second IR laser 120, and the third IR laser 122 can be unidirectional and can typically be registered by the simulator system 104 when laser beams are projected on a simulator display mechanism. The first IR laser 118 in combination with the second IR laser 120 can mimic a long-distance cartridge. The first IR laser 118 in combination with the third IR laser 122 can mimic a short-distance cartridge.

Typically, the first IR laser 118 can generate a pulse of light first and then the second IR laser 120 (or the third IR laser 122) can generate a pulse of light. For instance, the first IR laser 118 can generate a pulse of light and then 300 milliseconds later, the second IR laser 120 (or the third IR laser 122) can generate a pulse of light. It is to be appreciated that the staggered firing times of the first IR laser 118 and the second IR laser 120 (or the third IR laser 122) can be altered without exceeding the scope of the present invention. In one embodiment, the first IR laser 118, the second IR laser 120, and the third IR laser 122 can each generate a pulse of light with the same wavelength. In another embodiment, the first IR laser 118 can generate a pulse of light with a different wavelength than the pulse of light generated by the second IR laser 120 and the third IR laser 122.

As shown in one embodiment, the simulator system 104 can include a display 140, a control module 142, a sensor 144, and a receiver 146. The control module 142 can be adapted to run a program (or application) which can decipher signals received by the sensor 144 and the receiver 146 generated by the training disruptor device 102.

The display 140 can include, but is not limited to, a liquid crystal display, a plasma display panel, a light-emitting diode display, and a digital projector. It is to be appreciated that other displays are contemplated and not outside a scope of the present invention.

In a typical implementation, the control module 142 can include a processor 150, a random-access memory 152, a nonvolatile storage (or memory) 154, and a network interface 156. The processor 150 can be a single microprocessor, multi-core processor, or a group of processors. The random-access memory 152 can store executable code as well as data that may be immediately accessible to the processor 150. The nonvolatile storage 154 can store executable code and data in a persistent state. The control module 152 can also include the network interface 156 for sending and receiving data. The network interface 156 can include hardwired and/or wireless interfaces through which the control module 152 can communicate with other devices and/or networks.

The sensor 144 can be implemented to detect pulses of light generated by the first IR laser 118, the second IR laser 120, and the third IR laser 122.

The receiver 146 can include, but is not limited to, a universal serial bus receiver. In one embodiment, the USB receiver 146 can be connected to the simulator system through a universal serial bus port of the control module 142. The USB receiver 146 can be configured to receive a signal transmitted by the emitter 126. For example, when the emitter includes an infrared emitter, the receiver can be adapted to receive an infrared signal.

The emitter 136 can be adapted to transmit a wireless signal in response to one of the arc switches 128, 130 being pressed. For instance, the emitter 136 can transmit a signal including, but not limited to, a radio frequency signal, an infrared signal, and a Bluetooth signal. In one embodiment, the emitter 136 can be a light emitting diode (LED). The LED emitter 136 can generate an infrared signal to transmit to the simulator system 104. The emitter 136 can typically be omnidirectional such that a signal transmitted from the emitter 136 can be received by a suitable receiver of the simulator system 104. It is to be appreciated that the emitter 136 can be adapted to transmit a variety of wireless signals.

The simulator system 104 can be implemented to run a plurality of training scenarios. The training scenarios can be configured to change a sequence of events presented to a trainee based on signals received from the training disruptor device 102. For instance, a training scenario can branch into one or more sequences in response to signals received from the training disruptor device 102.

In one example, a training scenario can present a situation where a trainee should intend to shoot a perpetrator with a disruptor device. If the user pulls a trigger of the disruptor device and hits the perpetrator, the training scenario can branch to a video of the perpetrator being taken down by the disruptor device. If the user misses, the training scenario can branch to a video of the perpetrator escaping.

In another example, the training scenario could call for a trainee to caution a crowd by showing an arc. In such a scenario, if the trainee presses the arc switch, the training scenario could branch to a video of the crowd dissipating. If the trainee pulls the trigger or does not react soon enough, the training scenario could branch to a video of the crowd escalating in violence or charging the trainee. Typically, the simulator system 104 can alter a training scenario being presented to a trainee based on signals received from the training disruptor device 102.

Figure 2:
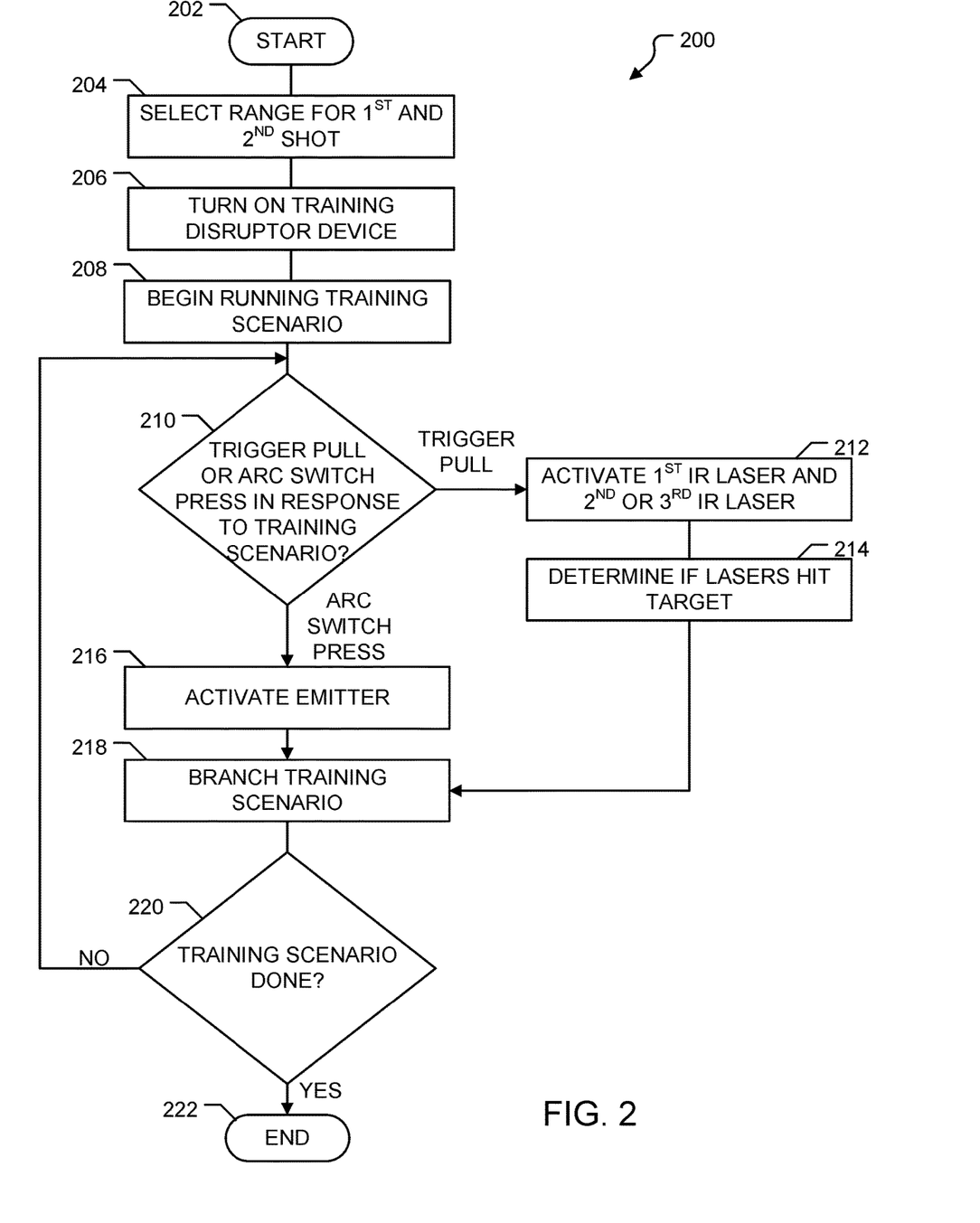
FIG. 2 is a flow diagram of one example implementation of a training disruptor device simulation system according to one embodiment of the present invention.

Referring to FIG. 2, a flow diagram of one example process (or method) 200 of an implementation of the training disruptor device 102 with the simulator system 104 is illustrated. Of note, an order of the process steps can be altered without exceeding a scope of the present invention.

In block 202, the process 200 for implementing the training disruptor device 102 with the simulator system 104 can start.

In block 204, a user can configure the first infrared laser switch 132 and the second infrared laser switch 134 to dictate how the training disruptor device 102 will operate when the trigger 126 is pulled. The user can configure the first infrared laser switch 132 and the second infrared laser switch 134 to determine if a close-range shot (e.g., the third IR laser 122 in combination with the first IR laser 118) is needed or a long-range shot (e.g., the second IR laser 120 in combination with the first IR laser 118) is needed.

In block 206, after the user has selected the range for the first simulated shot and the second simulated shot, the user can turn the training disruptor device 102 on. When the training disruptor device 102 is turned on, the first laser diode 112 and either the second laser diode 114 or the third laser diode 116 can be activated. Of note, the user may then determine where a simulated shot would hit based on a location of the first laser diode 112 and other laser diode.

In block 208, the simulator system 104 can begin to run a training scenario. The simulator system 104 can include a plurality of training scenarios adapted to test each function of a real disruptor device. The training scenario can follow a plurality of different paths depending on how a user interacts with the training disruptor device 102 in response to the training scenario. For instance, the training scenario can branch one of three ways depending on whether the user pulls the trigger 126, presses one of the ARC switch buttons 128, 130, or does not react soon enough. If the situation calls for the user to pull the trigger 126 and fire at a perpetrator, and if the simulator system 104 determines the shot hit the perpetrator, the training scenario can branch to a video of the perpetrator being taken down. The training scenario can branch to other videos if the user pressed one of the ARC switch buttons 128, 130 or did not react soon enough.

In decision block 210, the process 200 can determine if a user pulled the trigger 126 or pressed one of the ARC switch buttons 128, 130 of the training disruptor device 102 in response to the training scenario. If the trigger 126 is pulled, the process 200 can move to block 212. If one of the ARC switch buttons 128, 130 is pressed, the process 200 can move to block 216.

If the user pulls the trigger 126, the first IR laser 118 and either the second IR laser 120 or the third IR laser 122 can be activated to each generate a pulse of light in block 212. Of note, whether the second IR laser 120 or the third IR laser 122 is activated can be based on how the user configured the training disruptor device 102 to operate in block 204.

In block 214, the simulator system 104 can be adapted to detect an exact location of where the pulses of light generated by the IR lasers hit the display 140 of the simulator system 104. The simulator system 104 can include an application or program that can determine if the pulses of light hit a target of the training scenario. The simulator system 104 can branch from a path the training scenario is following when detecting the pulses of light and whether they hit an intended target.

In block 216, an emitter of the training disruptor device 102 can generate an infrared signal when one of the ARC switch buttons 128, 130 is pressed. The simulator system 104 can include the receiver 146 adapted to detect the infrared signal generated by the emitter 136.

In block 218, the simulator system 104 can branch from a path the training scenario is following when detecting an arc switch press or detecting the pulses of light from the IR lasers. Generally, the training scenario can be branched when there is a trigger pull or an arc switch press. In one embodiment, the training scenario can be branched when the simulator system does not detect either a trigger pull or an arc switch press.

In decision block 220, the process 200 can determine if the training scenario is done. If the training scenario is not done, the process 200 can return to block 210. If the training scenario is done, the process 200 can end in block 222.

Of note, the training disruptor device 102 can be configured to simulate two active cartridges. In one instance, after the trigger 126 has been pulled twice, the training disruptor device 102 can be configured to not activate any of the IR lasers 118, 120, 122 in response to the trigger being pulled again. Once the training disruptor device has been reset (e.g., turned off then back on), the IR lasers 118, 120, 122 can be ready to be activated again. In other instances, the simulator system 104 may be configured to ignore infrared signals from the IR lasers after two simulated shots have been detected.

Figure 3:
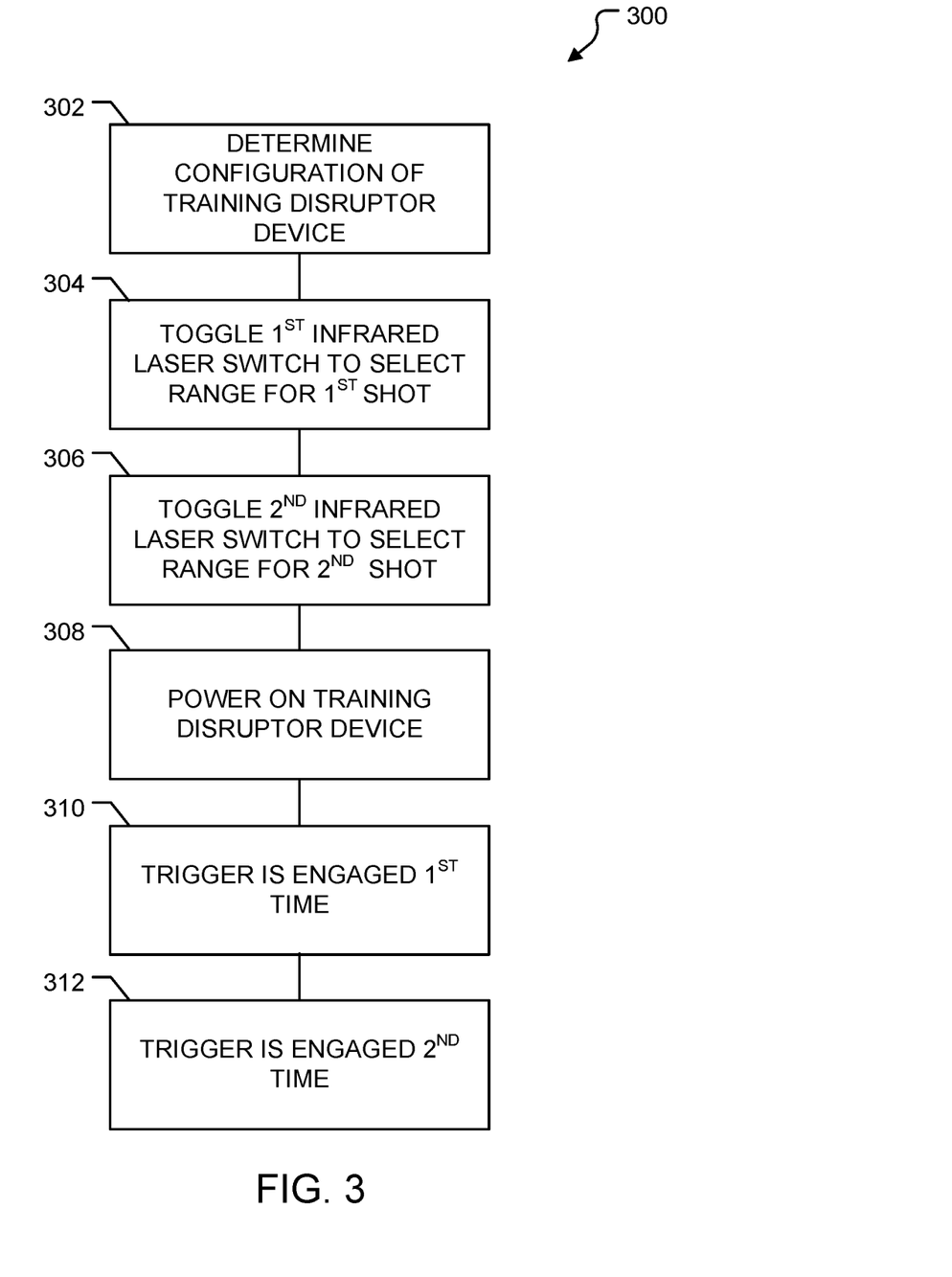
FIG. 3 is a flow diagram of one example implementation of a training disruptor device according to one embodiment of the present invention.

Referring to FIG. 3, a flow diagram of one example process (or method) of operation 300 of the training disruptor device 102 is illustrated. Of note, an order of the process steps can be altered without exceeding a scope of the present invention.

In block 302, a user can determine which configuration of the training disruptor device 102 may be appropriate for a particular training scenario. In some instances, the training scenario may indicate to a user which configuration should be used for training purposes. For instance, a training scenario may work on long range shots. In another instance, the training scenario may require a short range shot and a long-range shot.

In block 304, the user can configure the training disruptor device 102 for a first shot by toggling the first infrared laser switch 132. For a long-range shot, the user may select the second IR laser 120 for use in combination with the first IR laser 118. For a short-range shot, the user may select the third IR laser 122 for use in combination with the first IR laser 118.

In block 306, the user can configure the training disruptor device 102 for a second shot by toggling the second infrared laser switch 134. For a long-range shot, the user may select the second IR laser 120 for use in combination with the first IR laser 118. For a short-range shot, the user may select the third IR laser 122 for use in combination with the first IR laser 118.

In block 308, the training disruptor device 102 can be powered on. When the training disruptor device 102 is powered on, the first laser diode 112 can be powered on. The second laser diode 114 or the third laser diode 116 can also be powered on based on which IR laser is selected by the first infrared laser switch 132.

In block 310, the user can pull the trigger 126 a first time to activate the first IR laser 118 and either the second IR laser 120 or the third IR laser 122 based on which IR laser the user selected with the first infrared laser switch 132. After each of the IR lasers has been activated, a laser diode corresponding to a selected IR laser by the second IR laser switch 134 can be turned on.

In block 312, the user can pull the trigger 126 a second time to activate the first IR laser 118 and either the second IR laser 120 or the third IR laser 122 based on which IR laser the user selected with the second infrared laser switch 134.

After each of the IR lasers has been activated, the first laser diode 112 and either the second laser diode 114 or the third laser diode 116 can be powered off. In some instances, the laser diodes may stay on after the second trigger pull. Typically, the IR lasers 118, 120, 122 can be operatively disconnected (e.g., powered off) from the trigger 126 after the second trigger pull. As can be appreciated, this can help mimic a two-cartridge electrical conducted weapon.

Figure 4A:
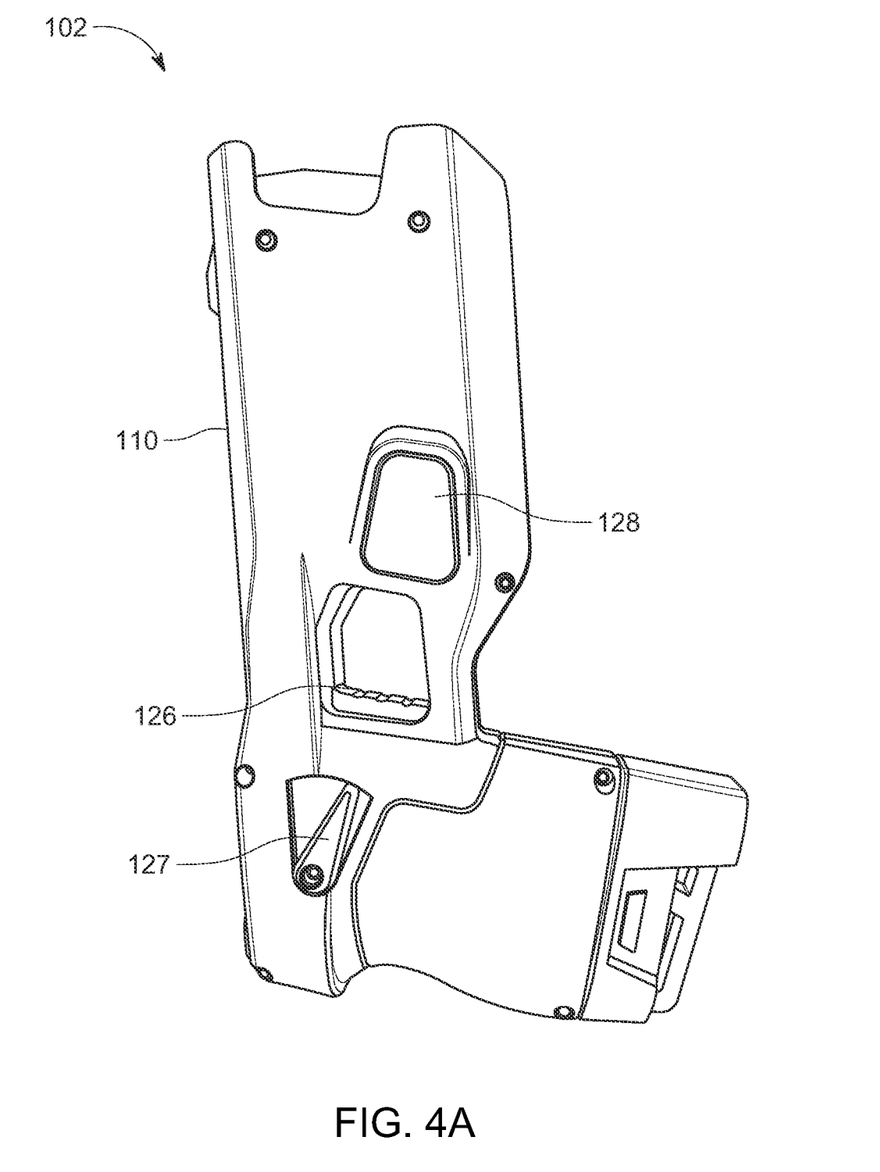
FIG. 4A is a side view of a training disruptor device according to one embodiment of the present invention.
Figure 4B:
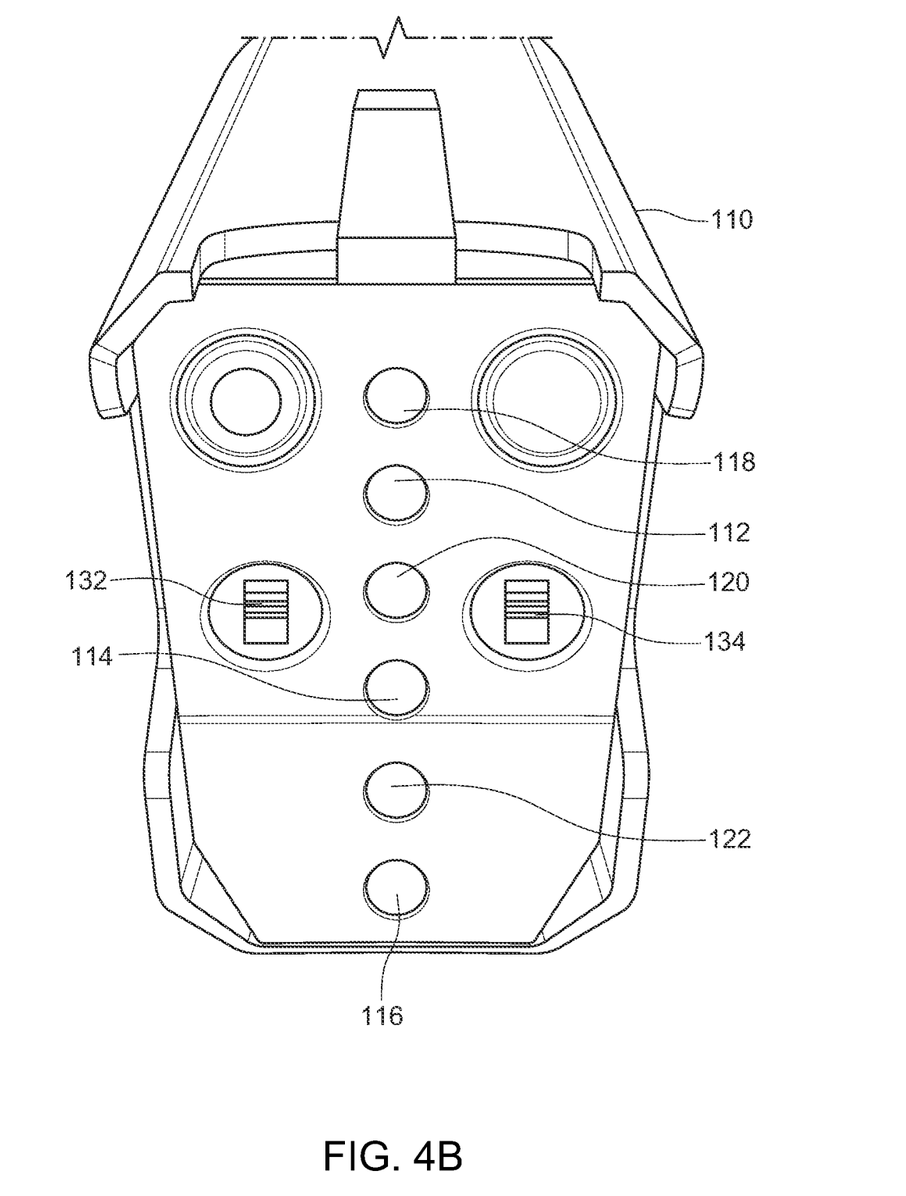
FIG. 4B is a front view of a training disruptor device according to one embodiment of the present invention.
Figure 4C:
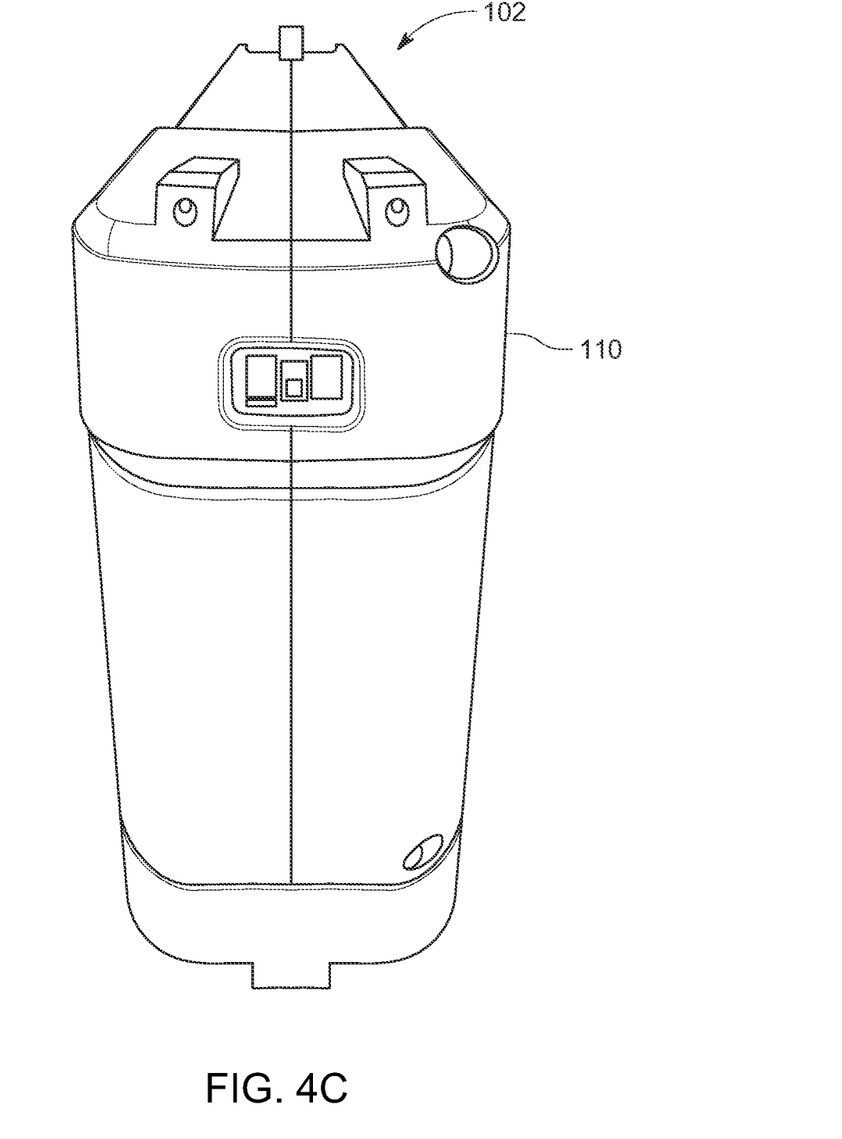
FIG. 4C is a back view of a training disruptor device according to one embodiment of the present invention.

Referring to FIGS. 4A-4C, detailed diagrams of one example embodiment of the training disruptor device 102 are illustrated. FIG. 4A includes a side view of the training disruptor device 102. FIG. 4B includes a front view of the training disruptor device 102. FIG. 4C includes a back view of the training disruptor device 102.

As shown generally in FIGS. 4A-4C, the body 110 of the training disruptor device 102 can look substantially similar to a body of a TASER 7®. The first actionable button 126 can be implemented to simulate a trigger of a TASER 7®. The second actionable button 128 and the third actionable button 130 can be implemented to simulate an ARC switch of a TASER 7®.

In one example embodiment, as shown in FIG. 4B, the first laser diode 112, the second laser diode 114, the third laser diode 116, the first IR laser 118, the second IR laser 120, the third IR laser 122, the first infrared laser switch 132, and the second infrared laser switch 134 can be located proximate a front of the training disruptor device 102. As previously mentioned, the first infrared laser switch 132 and the second infrared laser switch 134 can each be implemented to select one of the second IR laser 120 or the third IR laser 122 to be used in combination with the first IR laser 118. In some instances, insignia may be included to help a user toggle between the second IR laser 120 and the third IR laser 122.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

We claim:

1. A training disruptor device comprising:
a body that looks substantially similar to a body of a TASER 7®;
a first actionable button adapted to simulate a trigger of the TASER 7®;
a first infrared laser operatively connected to the first actionable button;
a second infrared laser oriented at approximately 12.0 degrees down from parallel with the first infrared laser and operatively connected to the first actionable button;
a third infrared laser oriented at approximately 3.5 degrees down from parallel with the first infrared laser and operatively connected to the first actionable button;
a first infrared laser switch adapted to toggle between the second infrared laser and the third infrared laser for a first simulated shot; and
a second infrared laser switch adapted to toggle between the second infrared laser and the third infrared laser for a second simulated shot.

2. The training disrupter device of claim 1, wherein the first infrared laser is adapted to be activated when the first actionable button is engaged.

3. The training disrupter device of claim 2, wherein the second infrared laser or the third infrared laser is adapted to be activated based on a configuration of the first infrared laser switch after the first actionable button is engaged a first time.

4. The training disruptor device of claim 3, wherein the second infrared laser or the third infrared laser is adapted to be activated based on a configuration of the second infrared laser switch after the first actionable button is engaged a second time.

5. The training disruptor device of claim 1, further including:
a first laser diode aligned with the first infrared laser;
a second laser diode aligned with the second infrared laser; and
a third laser diode aligned with the third infrared laser;
wherein each of the laser diodes generate visible light.

6. The training disruptor device of claim 5, wherein the first laser diode is activated when the training disruptor device is turned on.

7. The training disruptor device of claim 6, wherein the second laser diode or the third laser diode is activated based on a configuration of the first infrared laser switch when the training disruptor device is turned on.

8. The training disruptor device of claim 7, wherein the second laser diode or the third laser diode is activated based on a configuration of the second infrared laser switch after the first actionable button is engaged a first time.

9. The training disruptor device of claim 1, further including:
a second actionable button adapted to simulate an ARC switch of the TASER 7®; and
an emitter operatively connected to the second actionable button, the emitter adapted to be activated when the second actionable button is pushed.

10. The training disruptor device of claim 1, wherein the first infrared laser, the second infrared laser, and the third infrared laser are each adapted to be operatively disconnected from the first actionable button after the first actionable button has been engaged twice.

11. A training disruptor device comprising:
a body;
a first button;
a second button;
an emitter operatively connected to the second button, the emitter adapted to be activated when the second button is pushed; and
an engagement module consisting essentially of:
a first infrared laser operatively connected to the first button, the first infrared laser adapted to be activated when the first button is engaged;
a second infrared laser oriented at approximately 12.0 degrees down from parallel with the first infrared laser and operatively connected to the first button;
a third infrared laser oriented at approximately 3.5 degrees down from parallel with the first infrared laser and operatively connected to the first button;
a first laser diode aligned with the first infrared laser;
a second laser diode aligned with the second infrared laser;
a third laser diode aligned with the third infrared laser;
a first infrared laser switch adapted to toggle between the second infrared laser and the third infrared laser for a first simulated shot; and a second infrared laser switch adapted to toggle between the second infrared laser and the third infrared laser for a second simulated shot.

12. The training disruptor device of claim 11, wherein the first button simulates a trigger of a conducted electrical weapon.

13. The training disruptor device of claim 12, wherein the second button simulates an ARC switch of the conducted electrical weapon.

14. The training disruptor device of claim 11, wherein the first laser diode, the second laser diode, and the third laser diode each emit a visible beam of light.

15. The training disruptor device of claim 14, wherein the first laser diode emits a different colored light than the second laser diode and the third laser diode.

16. The training disruptor device of claim 11, wherein the first laser diode is activated when the training disruptor device is turned on.

17. The training disruptor device of claim 11, wherein the second laser diode or the third laser diode is adapted to be activated when the training disruptor device is turned on based on a configuration of the first infrared laser switch.

18. The training disruptor device of claim 11, wherein the second laser diode or the third laser diode is adapted to be activated after the first button is engaged a first time based on a configuration of the second infrared laser switch.

19. The training disruptor device of claim 11, wherein the training disruptor device is adapted to simulate a trigger and an arc switch of a TASER 7®.

20. A training disruptor device comprising:
a first actionable button;
a first infrared laser operatively connected to the first actionable button, the first infrared laser adapted to be activated when the first actionable button is engaged;
a second infrared laser oriented at approximately 12.0 degrees down from parallel with the first infrared laser and operatively connected to the first actionable button;
a third infrared laser oriented at approximately 3.5 degrees down from parallel with the first infrared laser and operatively connected to the first actionable button;
a first infrared laser switch adapted to toggle between the second infrared laser and the third infrared laser for a first simulated shot;
a second infrared laser switch adapted to toggle between the second infrared laser and the third infrared laser for a second simulated shot;
a first laser diode aligned with the first infrared laser;
a second laser diode aligned with the second infrared laser;
a third laser diode aligned with the third infrared laser;
wherein (i) the second infrared laser or the third infrared laser is adapted to be activated based on a configuration of the first infrared laser switch in response to the first actionable button being engaged a first time; and (ii) the second infrared laser or the third infrared laser is adapted to be activated based on a configuration of the second infrared laser switch in response to the first actionable button being engaged a second time.

* * * * *